United States Patent
Xiang et al.

(10) Patent No.: US 12,271,298 B2
(45) Date of Patent: Apr. 8, 2025

(54) DEDUPLICATING DATA CHUNKS USING CHUNK OBJECTS

(71) Applicant: VMware LLC, Palo Alto, CA (US)

(72) Inventors: Enning Xiang, San Jose, CA (US); Wenguang Wang, Santa Clara, CA (US); Yifan Wang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/333,986

(22) Filed: Jun. 13, 2023

(65) Prior Publication Data

US 2024/0419583 A1 Dec. 19, 2024

(51) Int. Cl.
*G06F 12/02* (2006.01)

(52) U.S. Cl.
CPC ........ *G06F 12/023* (2013.01); *G06F 12/0292* (2013.01); *G06F 2212/1044* (2013.01)

(58) Field of Classification Search
CPC ............... G06F 12/023; G06F 12/0292; G06F 2212/1044
See application file for complete search history.

(56) References Cited

U.S. PATENT DOCUMENTS

| 2016/0078068 A1* | 3/2016 | Agrawal | G06F 16/215 |
| | | | 707/692 |
| 2020/0264791 A1* | 8/2020 | Sasson | G06F 3/0683 |
| 2021/0109900 A1* | 4/2021 | McIlroy | G06F 16/1752 |

* cited by examiner

*Primary Examiner* — Masud K Khan
(74) *Attorney, Agent, or Firm* — King Intellectual Asset Management

(57) ABSTRACT

The disclosure herein describes deduplicating data chunks using chunk objects. A batch of data chunks is obtained from an original data object and a hash value is calculated for each data chunk. A first duplicate data chunk is identified using the hash value and a hash map. A chunk logical block address (LBA) of a chunk object is assigned to the duplicate data chunk. Payload data of the duplicate data chunk is migrated from the original data object to the chunk object, and a chunk map is updated to map the chunk LBA to a physical sector address (PSA) of the migrated payload data on the chunk object. A hash entry is updated to map to the chunk object and the chunk LBA. An address map of the original data object is updated to map an LBA of the duplicate data chunk to the chunk object and the chunk LBA.

20 Claims, 10 Drawing Sheets

DEDUPLICATING DATA CHUNKS USING CHUNK OBJECTS

BACKGROUND

In a distributed storage system, deduplication processes are used to improve the usage efficiency of data storage resources. By performing deduplication, duplicated data stored in data storage can be eliminated, freeing the associated data storage space for use in storing other data. However, deduplicating data in distributed storage systems can often break the locality relationship between data chunks and introduce increased I/O costs for accessing the deduplicated data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for deduplicating data chunks using chunk objects is described. A batch of data chunks is obtained from an original data object and a hash value is calculated for each data chunk. A first duplicate data chunk is identified using the hash value and a hash map. The identified first duplicate data chunk is deduplicated using the following processes. A chunk logical block address (LBA) of a chunk object is assigned to the first duplicate data chunk. Payload data of the first duplicate data chunk is migrated from the original data object to the chunk object, and a chunk map of the chunk object is updated to map the assigned chunk LBA to a physical sector address (PSA) of the migrated payload data of the first duplicate data chunk on the chunk object. A hash entry indexed by the hash value of the first duplicate data chunk in the hash map is updated to map to the chunk object and the assigned chunk LBA. An address map of the original data object is updated to map an LBA of the first duplicate data chunk to the chunk object and the assigned chunk LBA.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale. Any of the drawings may be combined into a single example or embodiment.

DETAILED DESCRIPTION

Figure 1:
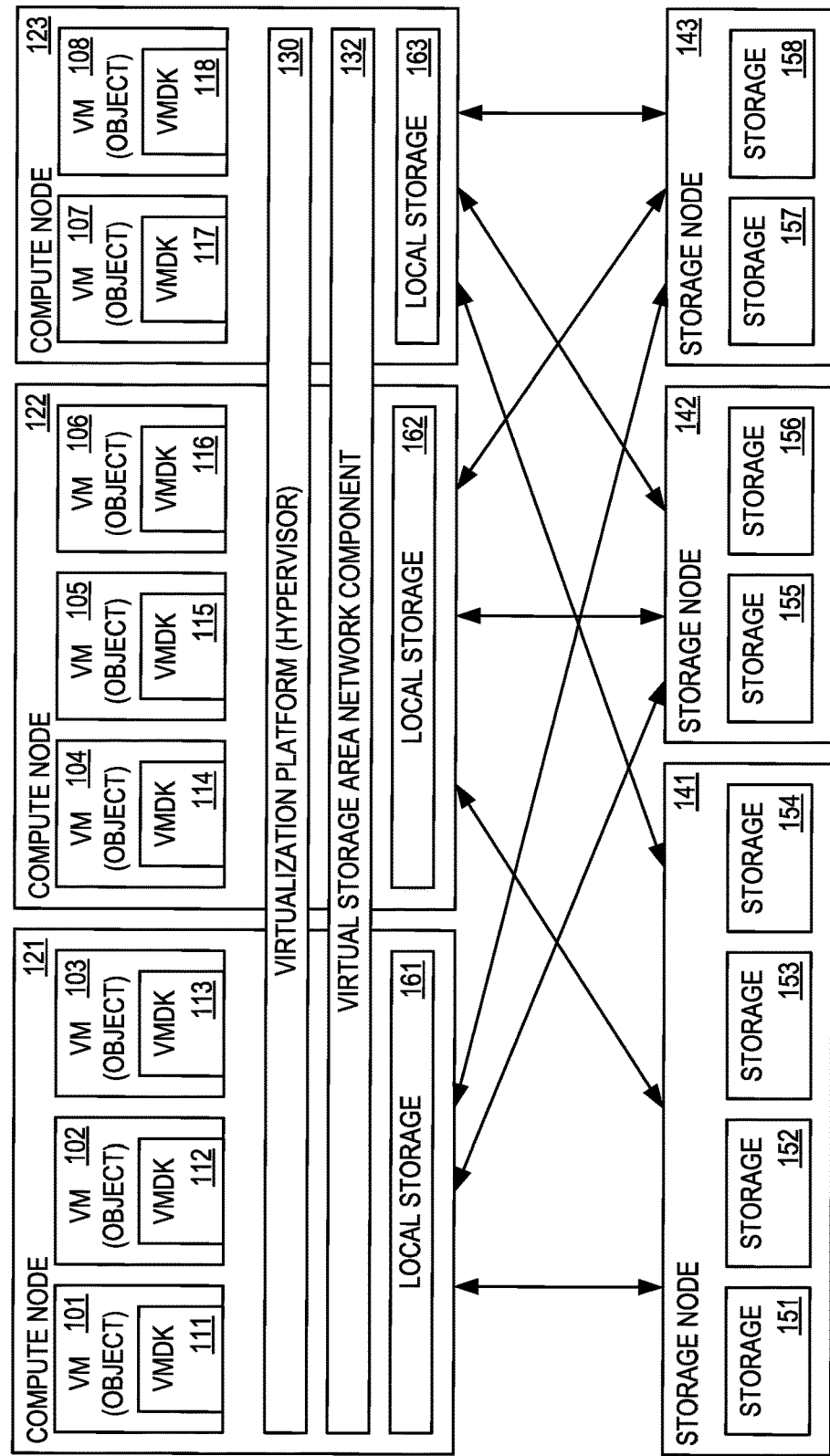
FIG. 1 is a block diagram illustrating an example system that is comprised of a set of compute nodes interconnected with each other and a set of storage nodes.

Aspects of the disclosure provide a computerized method and system for deduplicating data chunks using chunk objects. In some embodiments, the method obtains a batch of data chunks that are stored in an original data object. A hash value is generated for each of the data chunks in the batch. The hash values are used to evaluate whether each data chunk is a unique data chunk or a duplicate data chunk. For instance, a hash map of hash entries associated with data chunks that have already been evaluated is searched for a generated hash value of one of the data chunks in the batch to determine whether a matching data chunk has already been evaluated. In some examples, a first duplicate data chunk is identified in the batch of data chunks using the hash value of the data chunk and the hash map. The data chunk is determined to be a first duplicate data chunk because the hash map includes a matching hash entry, but the data in the matching hash entry indicates that the associated data chunk was considered to be a unique data chunk when previously processed. Thus, the identified data chunk is considered to be the first duplicate data chunk associated with the hash value.

The identified first duplicate data chunk is then deduplicated. An example deduplication process for first duplicate data chunks includes the following processes. A chunk LBA of a chunk object is assigned to the first duplicate data chunk and payload data of the first duplicate data chunk is migrated from the original data object to the chunk object. The chunk object is used to store the payload data of this duplicate data chunk and any other future duplicate data chunks that match this duplicate data chunk. The chunk map of the chunk object is updated to map the assigned chunk LBA to a PSA of the migrated payload data. The hash entry in the hash map that is indexed by the hash value of the first duplicate data chunk is updated to map to the chunk object (e.g., via a chunk ID of the chunk object) and the assigned chunk LBA. Further, the address map of the original data object is updated to map the LBA of the first duplicate data chunk to the chunk object and the assigned chunk LBA.

In some embodiments, the method operates in an unconventional manner at least by using a layer of chunk objects to store payload data of deduplicated data chunks in a manner that maintains the locality of groups of data chunks on the original data objects. In many examples, groups of data chunks that are written together to an original data object are related to each other and likely to be accessed together by future data requests. Duplicate data chunks are deduplicated in such a way that they tend to be migrated to one single chunk object, rather than being spread out across multiple hash objects. The metadata searching and comparison properties of the hash objects and associated hash maps are maintained in the disclosed system, while the payload data storage of deduplicated data chunks is moved to the chunk objects. This structure improves the rates and I/O costs associated with accessing multiple related, deduplicated data chunks by reducing the quantity of different data objects that must be accessed to retrieve the associated payload data.

Further, in some embodiments, an unconventional method of managing and/or maintaining metadata references between original data objects, hash objects, and chunk objects is described that enables the method to flexibly generate and/or initiate more chunk objects as necessary during deduplication processes. The described techniques reduce the likelihood that the chunk object-based data structures will be performance bottlenecks for the system and increase the computational efficiency of the use of data storage resources and other resources of the system.

FIG. 1 is a block diagram illustrating a system 100 that is comprised of a set of compute nodes 121-123 interconnected with each other and a set of storage nodes 141-143 according to an embodiment. In other examples, a different number of compute nodes and storage nodes are used without departing from the description. Each compute node hosts multiple objects, which are virtual machines (VMs), containers, applications, and/or any compute entity that can consume storage, in some examples. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node hosts 50, 100, or a different number of objects. Each object uses a virtual machine disk (VMDK). For example, VMDKs 111-118 are used by objects 101-108, respectively. Other implementations using different formats are also possible. A virtualization platform 130, which includes hypervisor functionality at one or more of computer nodes 121, 122, and 123, manages objects 101-108.

Figure 10:
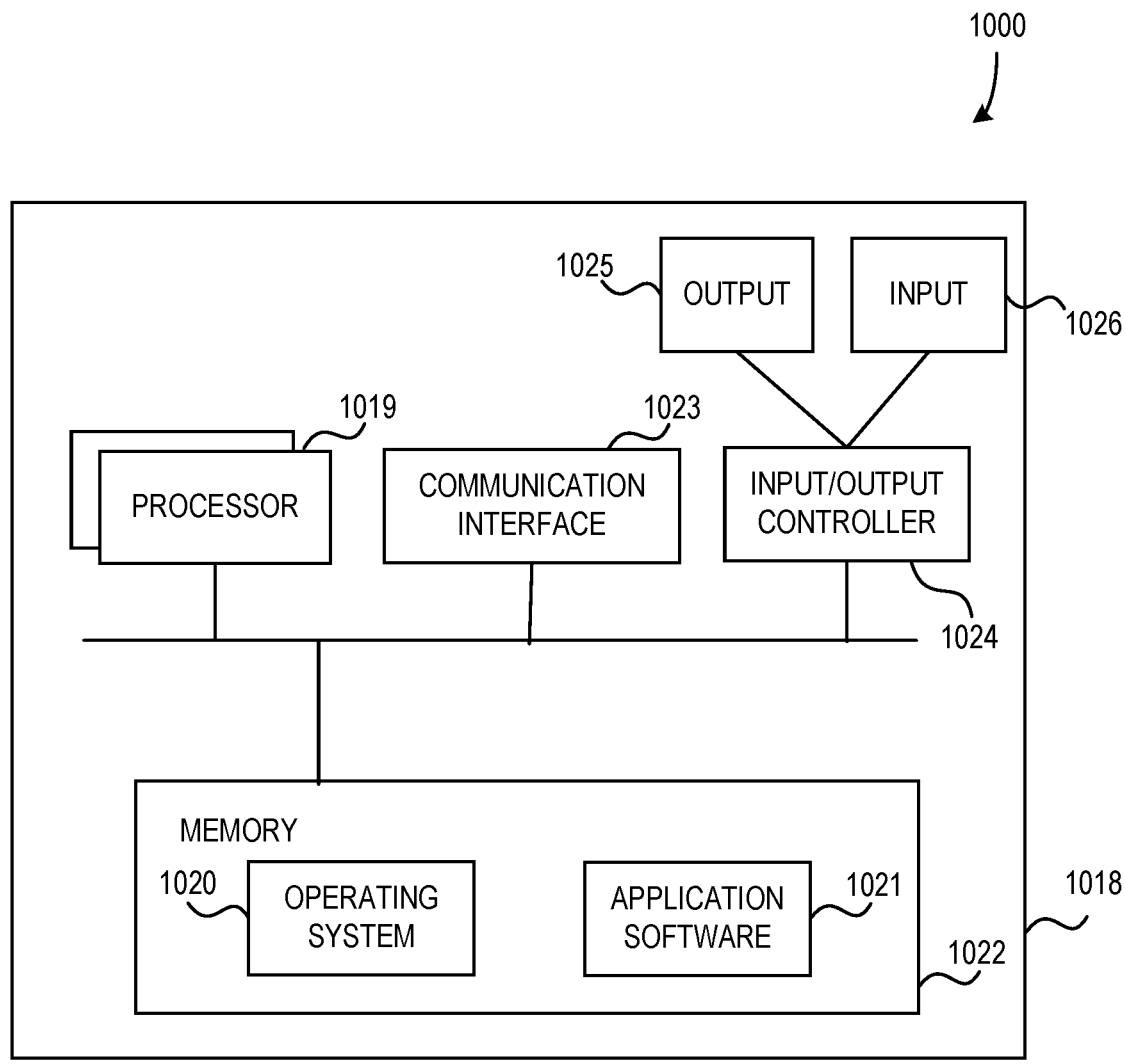
FIG. 10 illustrates an example computing apparatus as a functional block diagram.

In some examples, various components of system 100, for example compute nodes 121, 122, and 123, and storage nodes 141, 142, and 143 are implemented using one or more computing apparatuses 1018 of FIG. 10.

Virtualization software provides software-defined storage (SDS) by pooling storage nodes across a cluster, creates a distributed, shared data store (e.g., a storage area network (SAN)). In some examples with distributed arrangements, servers are distinguished as compute nodes (e.g., compute nodes 121, 122, and 123) and storage nodes (e.g., storage nodes 141, 142, and 143). In such examples, storage nodes attach large quantities of storage devices (e.g., flash, solid state drives (SSDs) and non-volatile memory express (NVMe) and Persistent Memory (PMEM)) processing power are limited beyond the ability to handle input/output (I/O) traffic. For example, storage node 141 has storage 151, 152, 153, and 154; storage node 142 has storage 155 and 156; and storage node 143 has storage 157 and 158. In other examples, a single storage node includes a different number of physical storage components without departing from the description. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

In some examples, thin provisioning is used and storage nodes 141-143 do not require significantly more processing power than is needed for handling I/O traffic. This arrangement is less expensive than many alternative hyperconverged environments in which all of storage nodes 141-143 have the same or similar processing capability as compute node 121. Using aspects of the disclosure, compute nodes 121-123 can operate with a wide range of storage options.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. For example, virtual SAN component 132 permits objects 101 and 102 to write incoming data from object 101 and incoming data from object 102 to storage nodes 141, 142, and/or 143, in part, by virtualizing the physical storage components of the storage nodes. Further, in some examples, the compute nodes 121, 122, and 123 include and make use of local storage nodes 161, 162, and 163, respectively, for storing some data used during the operation of the system 100 without departing from the description.

Figure 2:
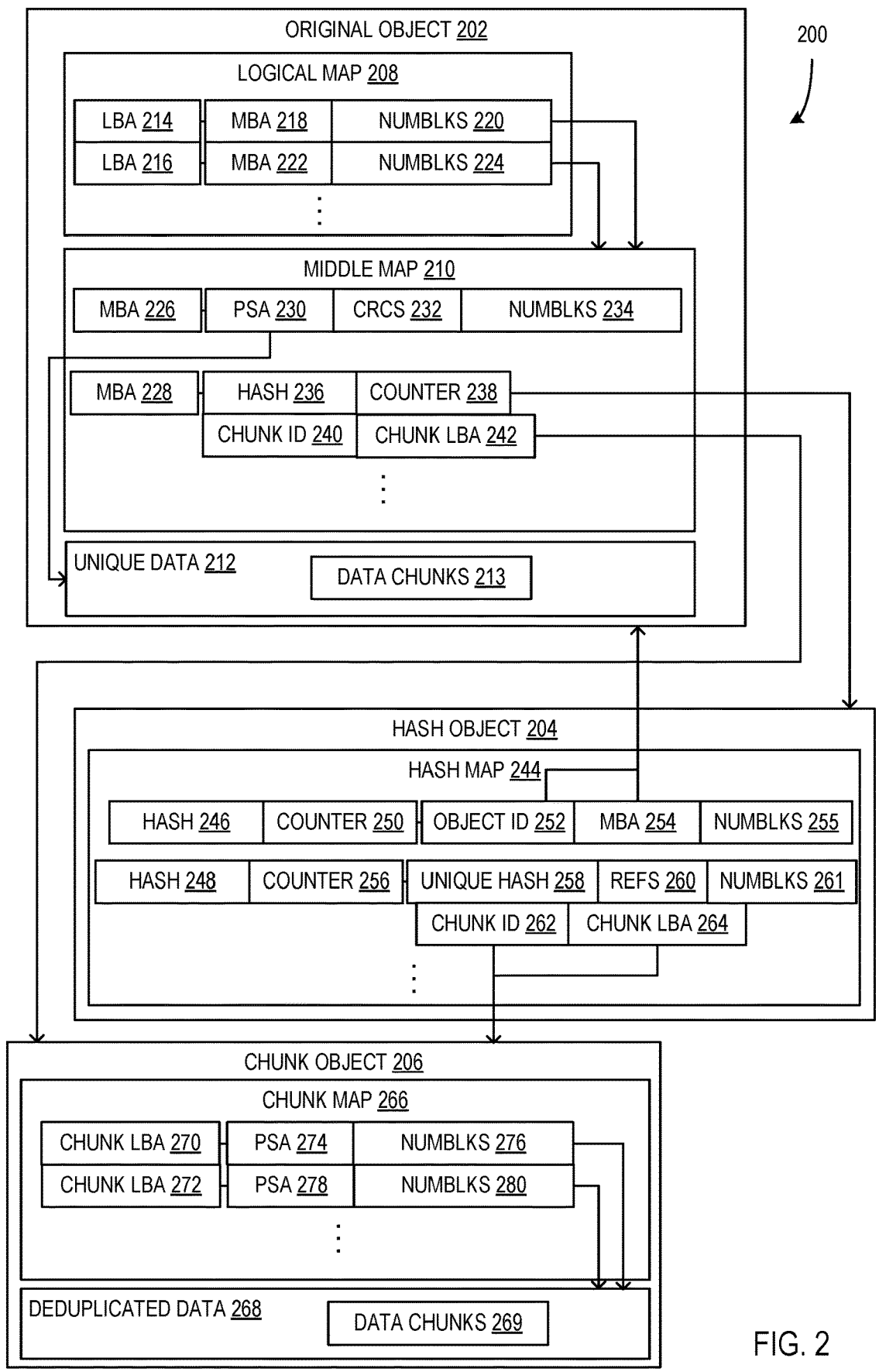
FIG. 2 is a block diagram illustrating an example system for deduplicating and storing data chunks in data objects.

FIG. 2 is a block diagram illustrating an example system 200 for deduplicating and storing data chunks in data objects (e.g., original object 202, hash object 204, and/or chunk object 206). In some examples, the system 200 is implemented in a system such as system 100 of FIG. 1. For example, the data objects 202-206 are used to store data as part of the virtual SAN component 132.

In some examples, original objects 202 are used to store data that is initially written to the system 200 and/or data chunks 213 that are unique (e.g., not duplicate data chunks). Data stored in the original object 202 is stored as data blocks, which are data units that are referred to using addresses. To perform the deduplication processes described herein, the data blocks of the system 200 are organized into data chunks 213, which are data structures that include a consecutive series of data blocks. In some examples, data chunks are identified or otherwise determined in a consistent manner, such that two groups of duplicate data blocks are divided into data chunks in the same way.

The original object 202 stores payload data of data blocks and associated data chunks 213 in a unique data 212 data store and metadata associated with the data blocks in a logical map 208 and a middle map 210. The logical map 208 includes metadata that maps logical block addresses (LBAs) to middle block addresses (MBAs) in the middle map 210. The middle map 210 includes metadata that maps MBAs to physical sector addresses (PSAs) that refer to data locations in the unique data 212 data store or to key data of hash objects 204 and/or chunk objects 206. If the associated data chunk is not a duplicate data chunk, the middle map 210 includes the PSA to a data location in the unique data 212 data store. Alternatively, if the associated data chunk is a duplicate data chunk, during the deduplication process described herein, the metadata associated with the duplicate data chunk is updated to link the MBA to associated hash objects 204 and chunk objects 206 as described herein.

As illustrated, the original object 202 includes a logical map 208 that has two illustrated entries of LBAs 214-216. The first entry maps an LBA 214 to an MBA 218 and numblks 220. It should be understood that "numblks" is a value that indicates the number or quantity of data blocks that is in the data chunk to which the associated address(es) refer. As such, numblks 220 is a value that indicates the number of data blocks associated with a data chunk that is referred to with the MBA 218. The second entry maps an LBA 216 to an MBA 222 and numblks 224. It should be understood that, in other examples, the logical map 208 includes more and/or different entries without departing from the description.

The middle map 210 includes two entries for associated MBAs 226-228. The first entry maps the MBA 226 to a PSA 230, associated cyclic redundancy check (CRC) values 232, and numblks 234. The numblks 234 is a value indicating the number of data blocks in the data chunk to which the MBA 226 and PSA 230 refer. The CRCs 232 are CRC values generated from each data block in the data chunk. The CRCs 232 are used for error checking, and, in some examples, the CRCs 232 are used to generate hash values (e.g., hash 236, 246, and/or 248) that are used during the described deduplication processes. Further, the CRCs 232 are generated from the data blocks when they first enter the system 200 (e.g., via a write instruction). As illustrated, the PSA 230 refers to a data location in the unique data 212 data store. Thus, the entry of the MBA 226 refers to a data chunk that is currently not considered a duplicate data chunk. It should be understood that, in other examples, other data values associated with the data chunks are used to generate the hash values, such as other error checking values or metadata values associated with the data chunks, without departing from the description.

The second entry of the middle map 210 maps the MBA 228 to key data of a hash object 236 and a chunk object 206. The hash object 204 includes a hash map 244 that is keyed by hash values combined with counter values that are used when there is a hash value collision. The MBA 228 is mapped to a hash 236 and an associated counter 238, which can be used to find a hash map entry in the hash map 244 that is indexed by the hash 236 and the counter 238. Further, the MBA 228 is mapped to a chunk ID 240 and a chunk LBA 242. The chunk ID 240 identifies a specific chunk object 206 and the chunk LBA 242 identifies a specific address within the logical address space of the chunk object 206. The chunk ID 240 and chunk LBA 242 of the MBA 228 entry can be used to locate associated chunk data in a chunk object 206. Thus, the entry of the MBA 228 refers to a duplicate data chunk for which the payload data has been migrated to a chunk object 206 as described herein.

In some examples, the system 200 includes one or more hash objects 204 that are configured to store hash maps 244. The hash maps 244 store metadata that is used during the deduplication processes described herein. Hash values stored in hash maps 244 are used to determine whether associated data chunks are duplicated data chunks within the system 200. To do so, a hash value is generated for a data chunk (e.g., based on the CRCs of the data blocks in the data chunk) and then the hash maps 244 are searched for that hash value. If the hash value is found, then the data chunk is considered a duplicate data chunk, or at least evaluated further to determine whether it is a duplicate data chunk using a unique hash (e.g., unique hash 258).

The hash objects 204 and associated hash maps 244 also store additional metadata associated with data chunks. As illustrated, the hash map 244 includes two entries of associated hashes 246-248. The first entry is indexed by the hash 246 and an associated counter 250. These values map to an object ID 252 (e.g., an identifier of an original object 202) and an MBA 254 and associated numblks 255 that refer to a data chunk stored on the object referenced by the object ID 252. Thus, the entry associated with hash value 246 refers to a unique or non-duplicate data chunk that is still stored on an original object 202. Such a hash entry is generated during the described deduplication process to track the unique data chunk and identify future data chunks that are duplicates of the unique data chunk.

The second entry is indexed by the hash 248 and an associated counter 256. These values map to a unique hash 258, a refs 260 value, a numblks 261, a chunk ID 262, and a chunk LBA 264. The unique hash 258 is a hash value generated from the data chunk using a strong hash function that has a very low chance of collision with unique hashes of other non-duplicate data chunks. In some examples, the hashes used to index the hash map 244 are short hash values that can be generated and compared quickly, but that have a higher chance of collision with other hash values. For example, the hashes 246-248 are calculated as 8-byte values. The counters 250 and 256 are 8-bit values that are used to ensure that the index values of the hash map 244 are unique. Thus, a collision of hash values of two non-duplicate data chunks can be resolved by associated hash map entries being assigned different counter values (e.g., the first entry associated with the hash value has a counter value of zero and the second entry associated with the hash value has a counter value of one). With 8-bit counter values, up to 256 collisions of a single hash value can be handled by the system 200. By contrast, in an example, the unique hash 258 is generated using a cryptographic hash function such as Secure Hash Algorithm 512 (SHA-512), which generates a hash value that is 512 bits, or 64 bytes, long. Thus, collisions between unique hashes of non-duplicate data chunks are virtually impossible or highly improbable.

The refs 260 value indicates the number or quantity of different entries that reference the deduplicated data chunk that is referenced by the associated chunk ID 262 and chunk LBA 264. For instance, in an example where five duplicate data chunks have been identified that match the deduplicated data chunk referred to by the hash 248 entry, the refs 260 value is set to five. Thus, five different entries in logical maps 208 of original objects 202 refer indirectly to this deduplicated data chunk (e.g., from LBA 216 to MBA 222 and from MBA 222 to a chunk ID 262 and a chunk LBA 264). In some examples, the refs 260 value is used to determine whether a deduplicated data chunk is still in use and/or whether it can be cleaned up by background processes of the system 200.

The chunk ID 262 refers to a chunk object 206 and the chunk LBA 264 refers to an entry in the associated chunk map 266. The numblks 261 indicates the quantity of data blocks that are in the data chunk to which the chunk ID 262 and chunk LBA 264 refer.

The chunk objects 206 of system 200 are used to store payload data and associated metadata of deduplicated data chunks in a structure that maintains the locality of data chunks that are originally organized contiguously or near one another (e.g., in an original object 202 when first written to the system 200). As illustrated, the chunk object 206 includes a chunk map 266 and associated deduplicated data 268. The chunk map 266 includes entries indexed by chunk LBAs that map to PSAs and associated numblks values. As illustrated, the first entry is indexed by chunk LBA 270 and mapped to a PSA 274 in the deduplicated data 268 data store of the chunk object 206. The associated numblks 276 value indicates the quantity of data blocks in the associated data chunk. The second entry is indexed by chunk LBA 272 and mapped to a PSA 278 in the deduplicated data 268 data store of the chunk object 206. The associated numblks 280 value indicates the quantity of data blocks in the associated data chunk.

It should be understood that, in some examples, the system 200 includes multiple original objects 202, hash objects 204, and chunk objects 206. Data objects of the system 200 can be generated as needed to house the data therein, such that new original objects 202 are created when additional storage space is needed from write instructions and new chunk objects 206 are created when additional storage space is needed to store deduplicated data chunks, as described herein. In some examples, the storage capacity of hash objects can be increased. However, in some such examples, additional hash objects cannot be created because a static sharding algorithm is used to distribute the hash entries of chunks across the multiple hash objects (e.g., the hash value of a chunk is placed onto a specific hash object by using a modulo operator on the hash value). Similarly, data objects of the system 200 are deleted or otherwise removed from use by the system 200 when their contents are no longer useful. However, because chunk objects 206 are used to store deduplicated data chunks that tend to be from the same original object 202 and/or that tend to have been originally written to the system 200 at the same general time, the locality that those deduplicated data chunks had in the original objects 202 is generally maintained in the chunk objects 206 to which the deduplicated data chunks are written. This structural feature in examples of the disclosure enable the system to maintain relatively efficient I/O resource use when accessing deduplicated data chunks in chunk objects 206, as there is a tendency for data chunks that originally had similar locality in an original object 202 to be accessed in response to the same read instruction or the like. For example, a related group of data blocks is written to an original object 202 and four data chunks are identified in that group of data blocks. Because the group of data blocks are related, many attempts to access one of the four data chunks also attempts to access one or more of the three other data chunks. Later, those four data chunks are deduplicated and migrated to a single chunk object. After the data chunks are placed on the chunk object, when the data chunks are accessed, only that chunk object needs to be accessed via I/O instructions to access all four data chunks.

This is in contrast to other systems in which the deduplicated data chunks are indexed directly by hash values. Because hash values tend to be equally spread throughout the entire hash value space, it is more likely that the four data chunks described above would be placed onto different hash objects 204 due to having hash values that differ significantly. Thus, attempting to access the four data chunks in such a system results in identifying and accessing multiple hash objects 204 with different I/O instructions, significantly increasing the I/O resource costs when compared to examples of the disclosure.

In some examples, logical block overwrites occurring at the original object 202 level can trigger deduplication deletion if the original block is part of a duplicate data chunk. The refs value 260 of the associated hash map 244 entry in the hash object 204 is updated to reflect that one less LBA references the hash entry and associated data chunk. In some such examples, the original object 202 appends the refs value 260 change to a deduplication deletion log locally to avoid latency on the write path. The entry records the target data chunk and the number of references to be removed. When the log records are aggregated up to a threshold, a process at the original object 202 performs a workflow to process the deduplication deletion log asynchronously in a similar way that the deduplication updates are processed as described herein. Deduplication deletion is an operation that only affects metadata and does not involve loading any payload data. The async batch approach saves network and I/O overhead and also provides flexibility to effectively throttle I/O overhead when the system has heavy traffic. When the last reference of a data chunk is released on the associated hash entry, the hash object 204 initiates a workflow to remove the data chunk from the chunk map of the chunk object. This information is also maintained in a log to decouple the data chunk cleanup from the processing of deduplication deletion requests. Data chunks of the outstanding deduplication updates may be overwritten at the original object 202 before the state of the data chunk is updated locally at the chunk object 206. The original object 202 leverages the deduplication deletion log to roll back the deduplication effect at the deduplicated data store for the impacted data chunks.

In some examples, the chunk deduplication processes described herein are performed by a chunk deduplicator of the system 200. The chunk deduplicator includes hardware, firmware, and/or software configured to perform the described deduplication processes, such as managing addresses of data chunks, migrating payload data to chunk objects, and/or managing maps associated with chunk objects and/or hash objects.

In some examples, the generation of hash values as described herein is performed by a hash value generator associated with the chunk deduplicator of system 200. The hash value generator includes hardware, firmware, and/or software configured to calculate or otherwise generate hash values that are used with the hash map as described herein.

In some examples, the identification of duplicate data chunks as described herein is performed by a duplicate identifier associated with the chunk deduplicator of system 200. The duplicate identifier includes hardware, firmware, and/or software configured to identify duplicate data chunks using hash values and associated hash maps of hash objects as described herein.

Further, in some examples, the processing of requests for data from the system 200 as described herein is performed by a request processing module. The request processing module includes hardware, firmware, and/or software configured to perform request processing operations, such as receiving requests, accessing entries in address maps, obtaining chunk IDs, accessing chunk entries, and/or obtaining payload data from entries in original data objects and/or chunk objects.

Figure 3:
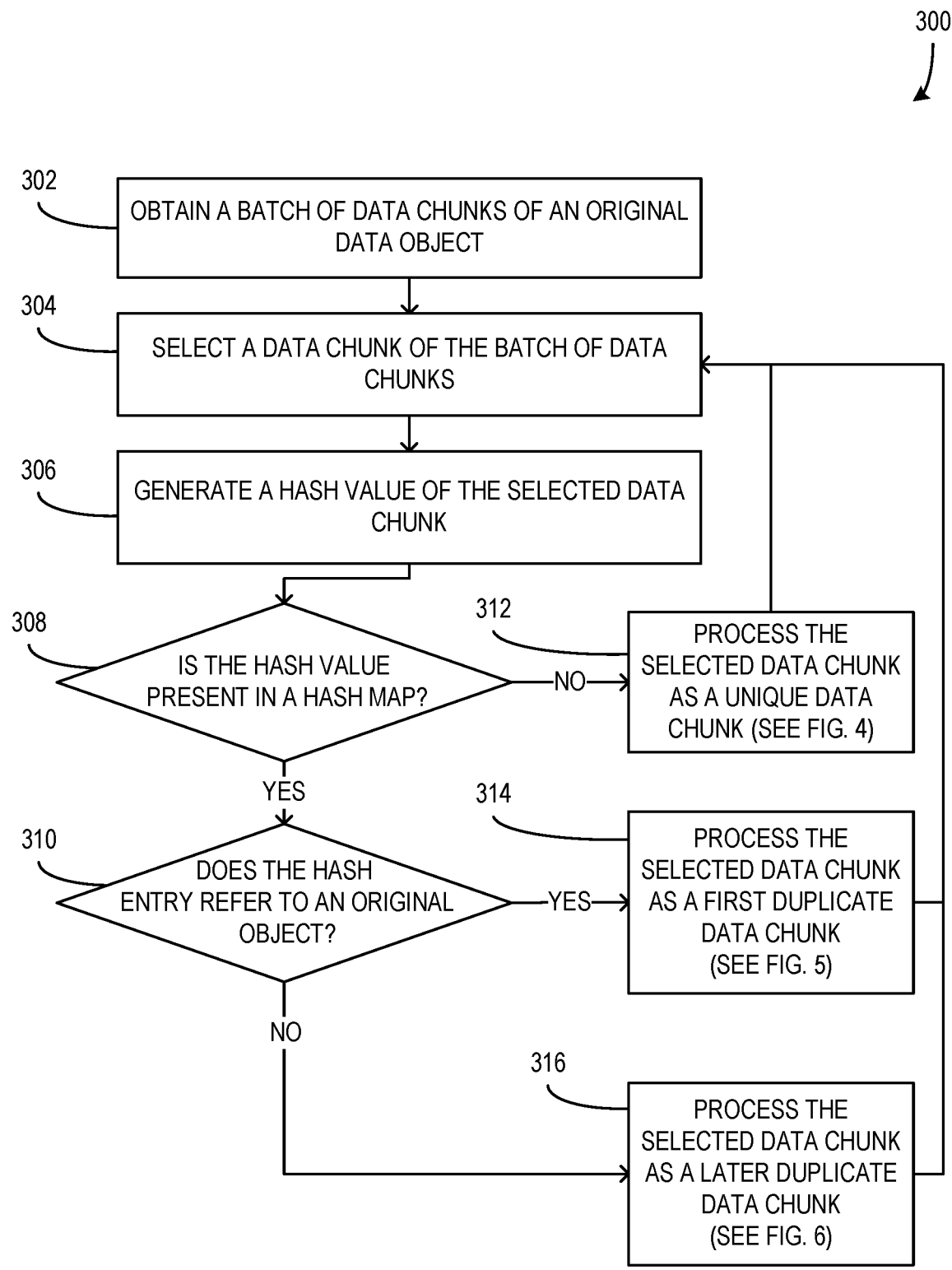
FIG. 3 is a flowchart illustrating an example method for deduplicating data chunks using chunk objects.

FIG. 3 is a flowchart illustrating an example method 300 for deduplicating data chunks using chunk objects (e.g., chunk object 206). In some examples, the method 300 is executed or otherwise performed in a system such as systems 100 and/or 200 of FIGS. 1 and/or 2, respectively.

At 302, a batch of data chunks 213 are obtained from an original data object 202 and, at 304, a data chunk is selected from the batch of data chunks 213. It should be understood that the method 300 is configured to process each data chunk in the batch of data chunks 213 as described herein. In some examples, a batch of data chunks includes up to 1000 data chunks and/or about 32 megabytes (MB) worth of data, though other batch sizes are used in other examples without departing from the description.

At 306, a hash value 246 is generated for the selected data chunk 213. In some examples, generating the hash value 246 includes using the CRC values 232 of the selected data chunk 213 to generate the hash value 246. Further, in some examples, a relatively fast hash function is used that generates a relatively short hash value 246 that can be efficiently compared with other hash values 246, as described above.

At 308, if the hash value 246 is present in a hash map 244 of a hash object 204, the process proceeds to 310. Alternatively, if the hash value 246 is not present in a hash map 244, the process proceeds to 312.

At 310, if the hash entry indexed by the hash value 246 refers to an original object 202, the process proceeds to 314. Alternatively, if the hash entry indexed by the hash value 246 does not refer to an original object 202, the process proceeds to 316. In some examples, the determination of whether the selected data chunk is a "first duplicate data chunk" is based on whether a unique hash value is present in a compared hash entry. The selected data chunk is not determined to be the "first duplicate data chunk" of an otherwise unique data chunk unless that unique data chunk is represented with a hash entry that includes a unique hash value.

At 312, the selected data chunk 213 is processed as a unique data chunk, or a non-duplicate data chunk. In some examples, the selected data chunk 213 is processed as described below with respect to method 400 of FIG. 4. After the processing is complete, the process returns to 304 to select another data chunk from the batch of data chunks.

At 314, the selected data chunk 213 is processed as a first duplicate data chunk. The "first duplicate data chunk" is a duplicate data chunk that is the first data chunk that is detected to be a duplicate of an otherwise-unique data chunk. In some examples, the selected data chunk 213 is processed as described below with respect to method 500 of FIG. 5. After the processing is complete, the process returns to 304 to select another data chunk from the batch of data chunks.

At 316, the selected data chunk 213 is processed as a later duplicate data chunk. The "later duplicate data chunk" is a duplicate data chunk that is detected to be a duplicate of an already-deduplicated data chunk. In some examples, the selected data chunk 213 is processed as described below with respect to method 600 of FIG. 6. After the processing is complete, the process returns to 304 to select another data chunk from the batch of data chunks.

In some examples, the deduplication processes of method 300 are performed asynchronously after data has been written to original objects to minimize the performance impact to foreground I/O processes. Further, the method 300 is configured to avoid deduplicating newly written data that tends to be overwritten again in a short time. This reduces the quantity of data that needs to be deduplicated by the method 300. When resource usage of the associated system is relatively light, the method 300 is initiated and/or assigned a larger quantity of resources for use in deduplicating data on the system. Additionally, or alternatively, the method 300 is configured to perform deduplication processes using throttled resources during relatively busy times on the system.

Further, in some examples, the method 300 is performed by one processing thread per original data object, enabling the examples of the methods to scale out. Because MBA values (e.g., MBAs 226-228) increase monotonically within the original data object, new ranges of MBA values can easily be read by the processing thread when the method 300 is initiated to obtain a new batch of data chunks.

In some examples, the outstanding batch of data chunks that are being duplicated is persisted on the original object for use in crash recovery. It is idempotent to update the hash map entry of a data chunk by tracking outstanding updates. The chunk maps of the chunk objects track data chunk payload data that are in a chunk bank waiting to be processed (as described below). Thus, flushing a chunk bank to data storage of a chunk object can be done during crash recovery as well.

Figure 4:
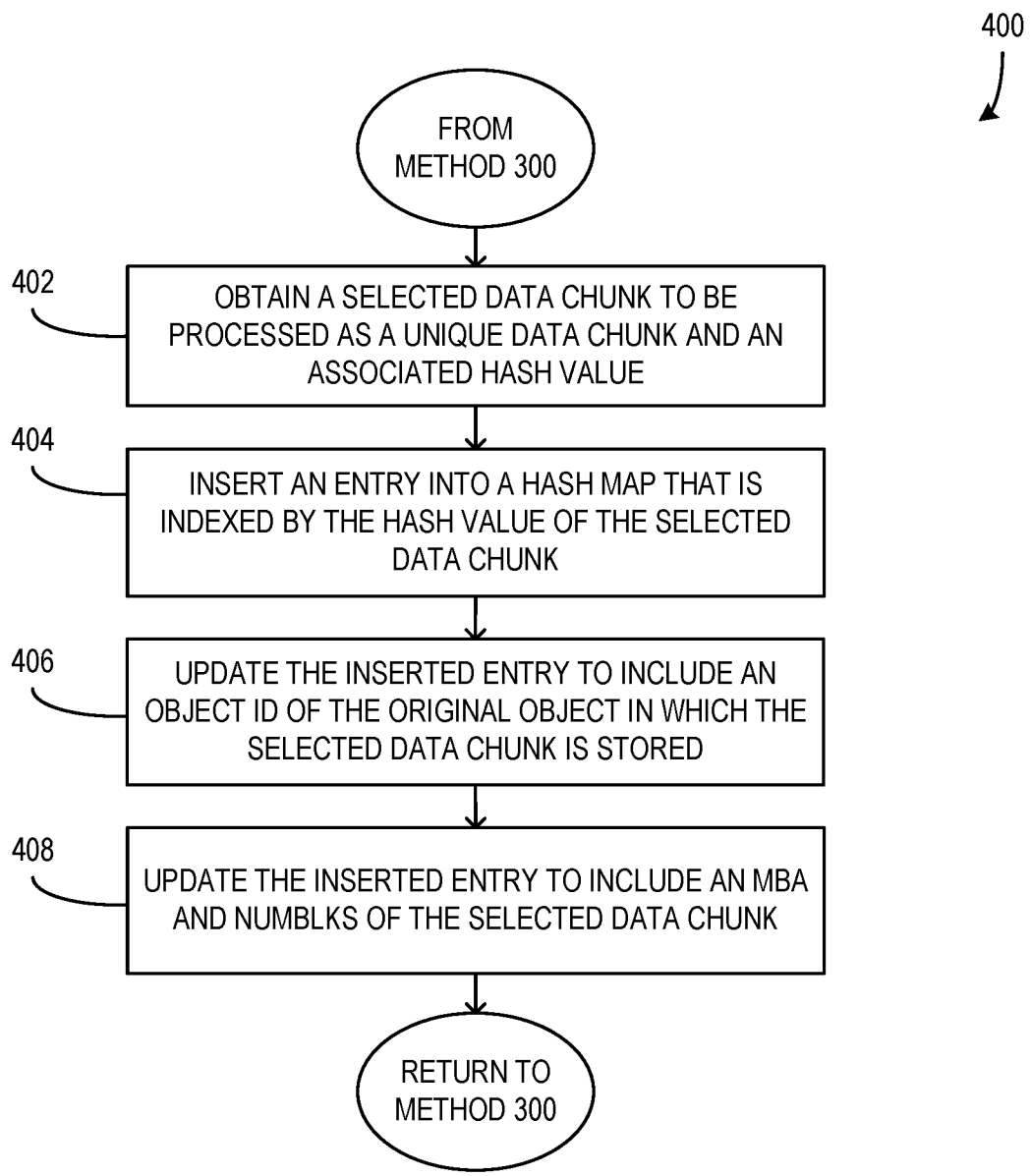
FIG. 4 is a flowchart illustrating an example method for processing a data chunk as a unique data chunk.

FIG. 4 is a flowchart illustrating an example method 400 for processing a data chunk 213 as a unique data chunk. In some examples, the method 400 is executed or otherwise performed in a system such as systems 100 and/or 200 of FIGS. 1 and/or 2, respectively. Further, in some examples, the method 400 is executed or otherwise performed as part of the method 300 of FIG. 3 as described above. For instance, the method 400 is performed as part of 312 of method 300.

At 402, the selected data chunk 213 to be processed as a unique data chunk and an associated hash value 246 of the selected data chunk is obtained.

At 404, an entry that is indexed by the hash value 246 of the selected data chunk is inserted into a hash map 244 of a hash object 204. Because the selected data chunk 213 has been found to be a unique data chunk, an entry in the hash map 244 that is indexed by the hash value 246 is not already present.

At 406, the inserted entry is updated to include an object ID 252 of the original object 202 in which the selected data chunk 213 is stored and, at 408, the inserted entry is updated to include an MBA 254 and numblks 255 of the selected data chunk 213. The process then returns to method 300.

In some examples, the hash map 244 is indexed using hash values and counter values (e.g., hash values 246-248 and counters 250-256 of FIG. 2). In such examples, the inserted entry is indexed by the hash value 246 of the selected data chunk 213 and a counter value 250. The counter value 250 is determined by identifying another entry indexed by the hash value 246 that has a highest associated counter value and incrementing the highest counter value to calculate the counter value 250. If there are no entries indexed by the hash value 246, the counter value 250 is set to zero. In other examples, the counter values of the hash map 244 indices are managed in different ways without departing from the description.

Figure 5:
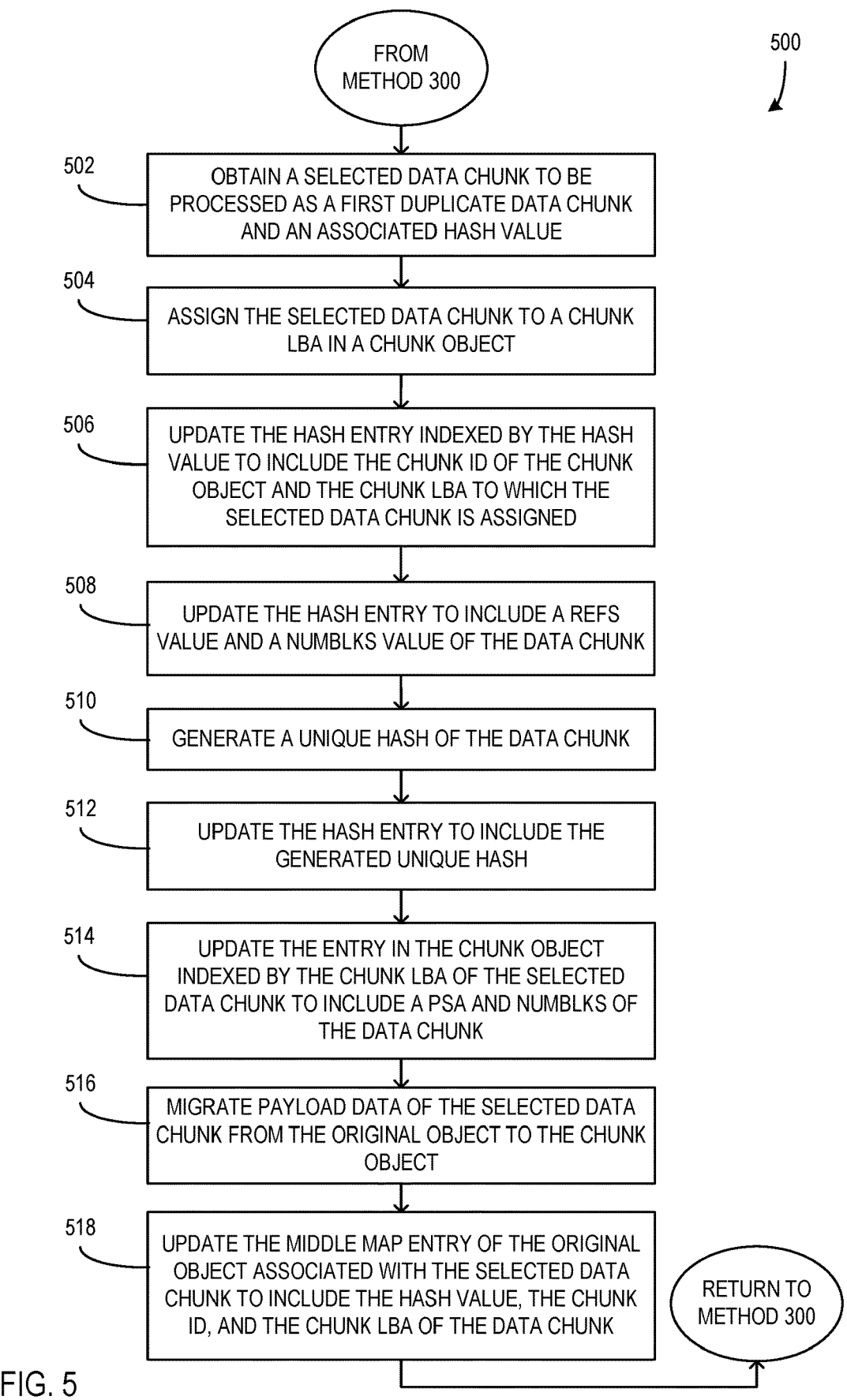
FIG. 5 is a flowchart illustrating an example method for processing a data chunk as a first duplicate data chunk.

FIG. 5 is a flowchart illustrating an example method 500 for processing a data chunk 213 as a first duplicate data chunk. In some examples, the method 500 is executed or otherwise performed in a system such as systems 100 and/or 200 of FIGS. 1 and/or 2, respectively. Further, in some examples, the method 500 is executed or otherwise performed as part of the method 300 of FIG. 3 as described above. For instance, the method 500 is performed as part of 314 of method 300.

At 502, the selected data chunk 213 and an associated hash value 246 are obtained. At 504, the selected data chunk 213 is assigned to a chunk LBA 242 in a chunk object 206. In some examples, a chunk object 206 is not currently available and a new chunk object 206 is selected or otherwise obtained. A range of continuous chunk LBAs is reserved for use by the new chunk object 206 and the selected data chunk 213 is then assigned to a chunk LBA of that range of chunk LBAs.

At 506, the hash entry indexed by the hash value 246 is updated to include the chunk ID 240 of the chunk object 206 and the chunk LBA 242 to which the selected data chunk 213 is assigned. At 508, the hash entry is updated to include a refs 260 value and a numblks 261 value of the data chunk 213. At 510, a unique hash 258 of the data chunk 213 is generated (e.g., using a cryptographic hash function as described above) and, at 512, the hash entry is updated to include the generated unique hash 258.

At 514, the entry in the chunk object 206 indexed by the chunk LBA 242 of the selected data chunk 213 is updated to include a PSA 274 and numblks 276 of the data chunk 213.

At 516, payload data of the selected data chunk 213 is migrated from the original object 202 to the chunk object 206. In some examples, the migrated payload data is stored in the deduplicated data 268 of the chunk object 206 as a data chunk 269. Further, in some examples, migrating the payload data includes setting an "in-flight" flag to true for the selected data chunk 213 to prevent other duplicate data chunks from also being migrated during the process. The in-flight flag is set in the hash map entry associated with the selected data chunk 213. When a duplicate data chunk is identified but the in-flight flag of the hash map entry is set to true, the method 500 refrains from performing the payload data migration. After the payload data has been migrated and the in-flight flag is set to false, other duplicate data chunks will be handled as "later duplicate data chunks" as described below with respect to FIG. 6.

In some examples, the migration of the payload data includes adding the payload data to a chunk bank that is organized by MBAs of the data chunks therein, such that contiguous and/or close proximity data chunks are likely to be placed into the same chunk bank, maintaining any existing spatial locality of the data chunks. When the chunk bank reaches a threshold of stored data, it is all flushed to the same chunk object 206, such that the payload data of the duplicate data chunk is referenced by the chunk LBA as described herein.

At 518, the middle map entry of the original object 202 associated with the selected data chunk 213 is updated to include the hash value 236, the chunk ID 240, and the chunk LBA 242 of the data chunk 269. In examples where counter values are used as part of the indices of entries of the hash map 244, the middle map entry is also updated to include the counter 250 value (e.g., as counter 238) with which the selected data chunk 213 is associated. Further, in some examples, the middle map entry of the original object 202 that is associated with the data chunk of which the selected data chunk is a duplicate is updated to reference the hash entry, chunk object, and chunk LBA of the newly deduplicated data object. After 518, the process returns to method 300.

Figure 6:
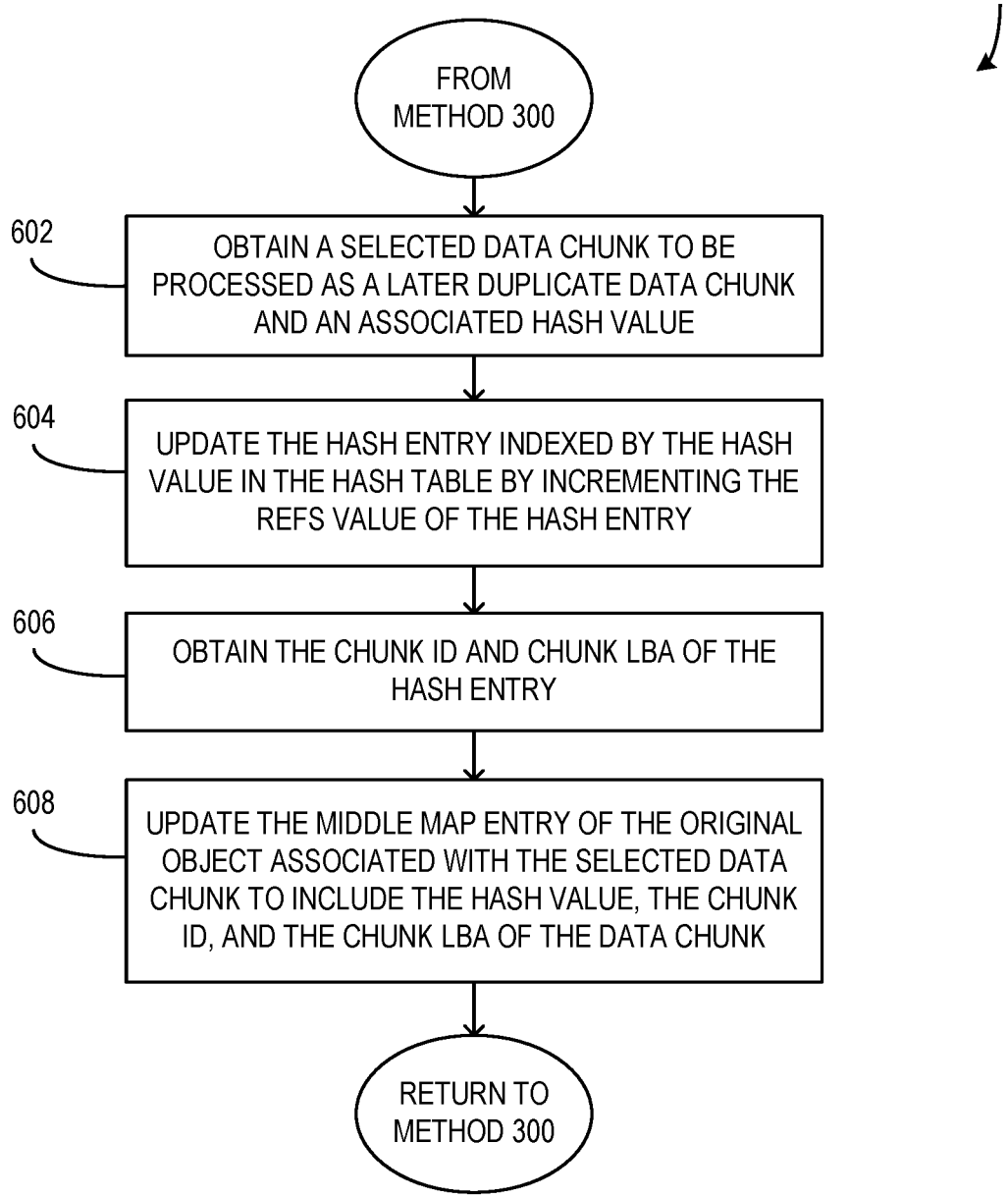
FIG. 6 is a flowchart illustrating an example method for processing a data chunk as a later duplicate data chunk.

FIG. 6 is a flowchart illustrating an example method 600 for processing a data chunk 213 as a later duplicate data chunk. In some examples, the method 600 is executed or otherwise performed in a system such as systems 100 and/or 200 of FIGS. 1 and/or 2, respectively. Further, in some examples, the method 600 is executed or otherwise performed as part of the method 300 of FIG. 3 as described above. For instance, the method 600 is performed as part of 316 of method 300.

At 602, the selected data chunk 213 and an associated hash value 246 is obtained. At 604, the hash entry indexed by the hash value 246 in the hash table is updated by incrementing the refs 260 value of the hash entry.

At 606, the chunk ID 262 and chunk LBA 264 of the hash entry are obtained and, at 608, the middle map entry of the original object associated with the selected data chunk 213 is updated to include the hash value 236, the chunk ID 240, and the chunk LBA 242 of the data chunk 213. After 608, the process returns to method 300.

In examples where counter values are used as part of the indices of entries of the hash map 244, the middle map entry is also updated to include the counter 250 value (e.g., as counter 238) with which the selected data chunk 213 is associated.

Figure 7:
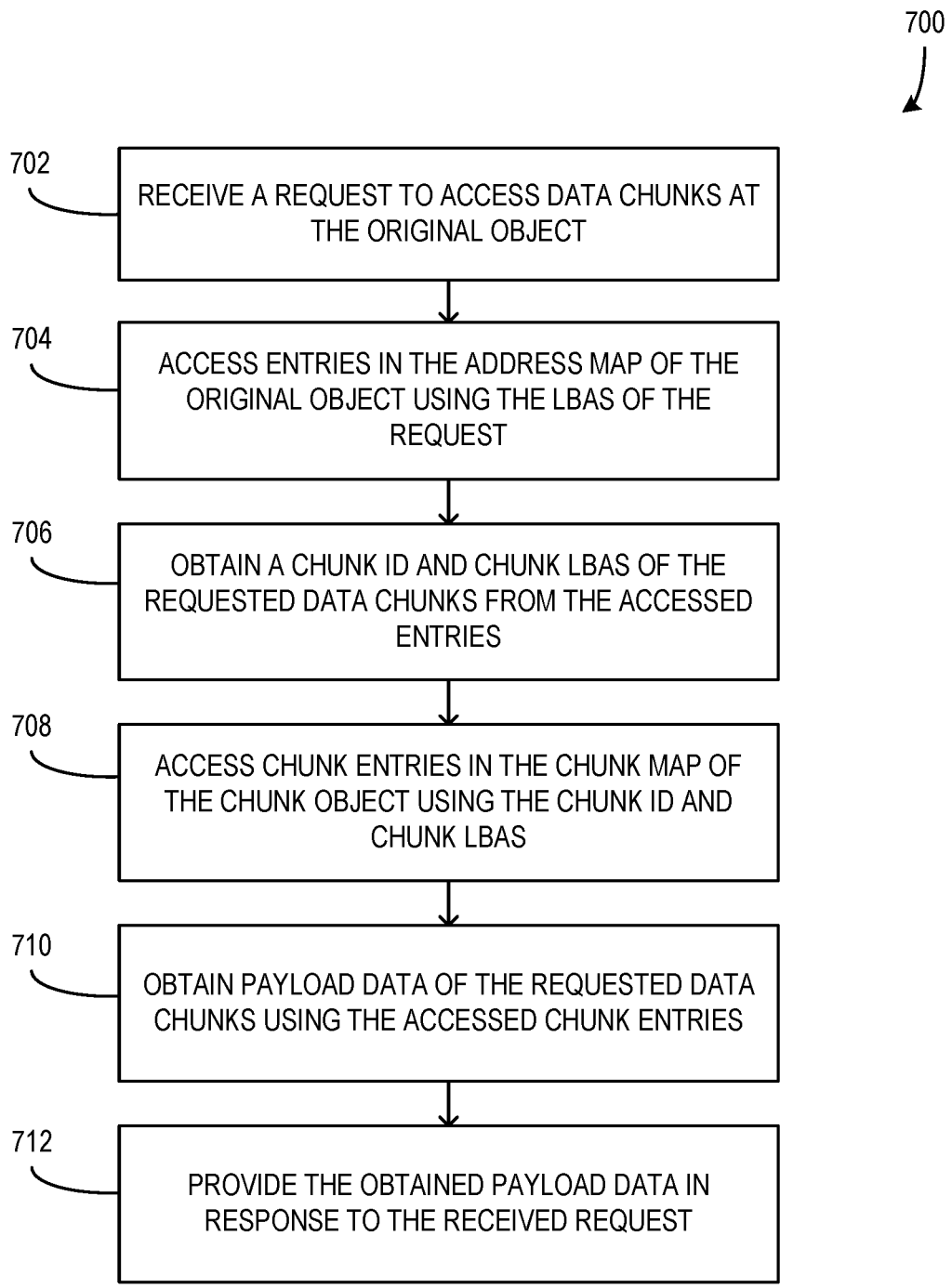
FIG. 7 is a flowchart illustrating an example method for accessing data in a chunk object.

FIG. 7 is a flowchart illustrating an example method 700 for accessing data in a chunk object. In some examples, the method 700 is executed or otherwise performed in a system such as systems 1 and/or 2 of FIGS. 1 and/or 2, respectively.

At 702, a request to access data chunks at an original object is received. In some examples, the request includes a plurality of LBAs associated with the requested data chunks. For example, the received request is a request for a group of data chunks that are all associated with a specific file or other data structure.

At 704, entries in the address map of the original object are accessed using the LBAs of the request. In some examples, accessing the entries of the address map includes accessing the logical map 208 of the original object 202 to obtain associated MBAs (e.g., LBA 214 is used to obtain MBA 218 and LBA 216 is used to obtain MBA 222) and then using those obtained MBAs with a middle map 210 to obtain references to the data chunks themselves.

At 706, a chunk ID of a chunk object and a group of chunk LBAs of the requested data chunks are obtained from the accessed entries. In some examples, obtaining the data includes accessing entries of the middle map 210 of the original object 202 using MBAs to obtain a chunk ID 240 that links to a chunk object 206 and associated chunk LBAs 242 that can be used with a chunk map 266 of the chunk object 206.

At 708, chunk entries of the chunk map of the chunk object are accessed using the chunk ID and the chunk LBAs. In some examples, this includes accessing entries of the chunk map 266 using the chunk LBAs, which indexes the entries (e.g., chunk LBA 270 indexes the entry that maps to PSA 274 and chunk LBA 272 indexes the entry that maps to PSA 278).

At 710, payload data of the requested data chunks are obtained using the accessed chunk entries. In some examples, the payload data in the deduplicated data 268 data store of the chunk object 206 is obtained using PSAs of the chunk entries in the chunk map 266.

At 712, the obtained payload data is provided in response to the received request. In some examples, the obtained payload data is transferred back to the original object 202 and provided in a response message to the source of the request.

In some examples, some of the requested data chunks are located in the original object itself (e.g., the unique data 212 data store) and/or on other chunk objects 206. In such examples, obtaining the payload data for use in responding to the request includes using the address map of the original object to obtain addresses and/or references to the data chunks in the local data store and/or on the other chunk objects. In some such examples, locally stored data is accessed using two B-tree lookups (e.g., on the logical map 208 and on the middle map 210) and data on chunk objects is accessed using three B-tree lookups (e.g., on the logical map 208, on the middle map 210, and on the chunk map 266). However, in some examples, the lookup of data chunks on chunk objects can be optimized by storing the chunk ID and chunk LBA of deduplicated data chunks in both the logical map and the middle map, such that accessing such data chunks requires only two B-tree lookups (e.g., on the logical map 208 and then on the chunk map 266).

Figure 8:
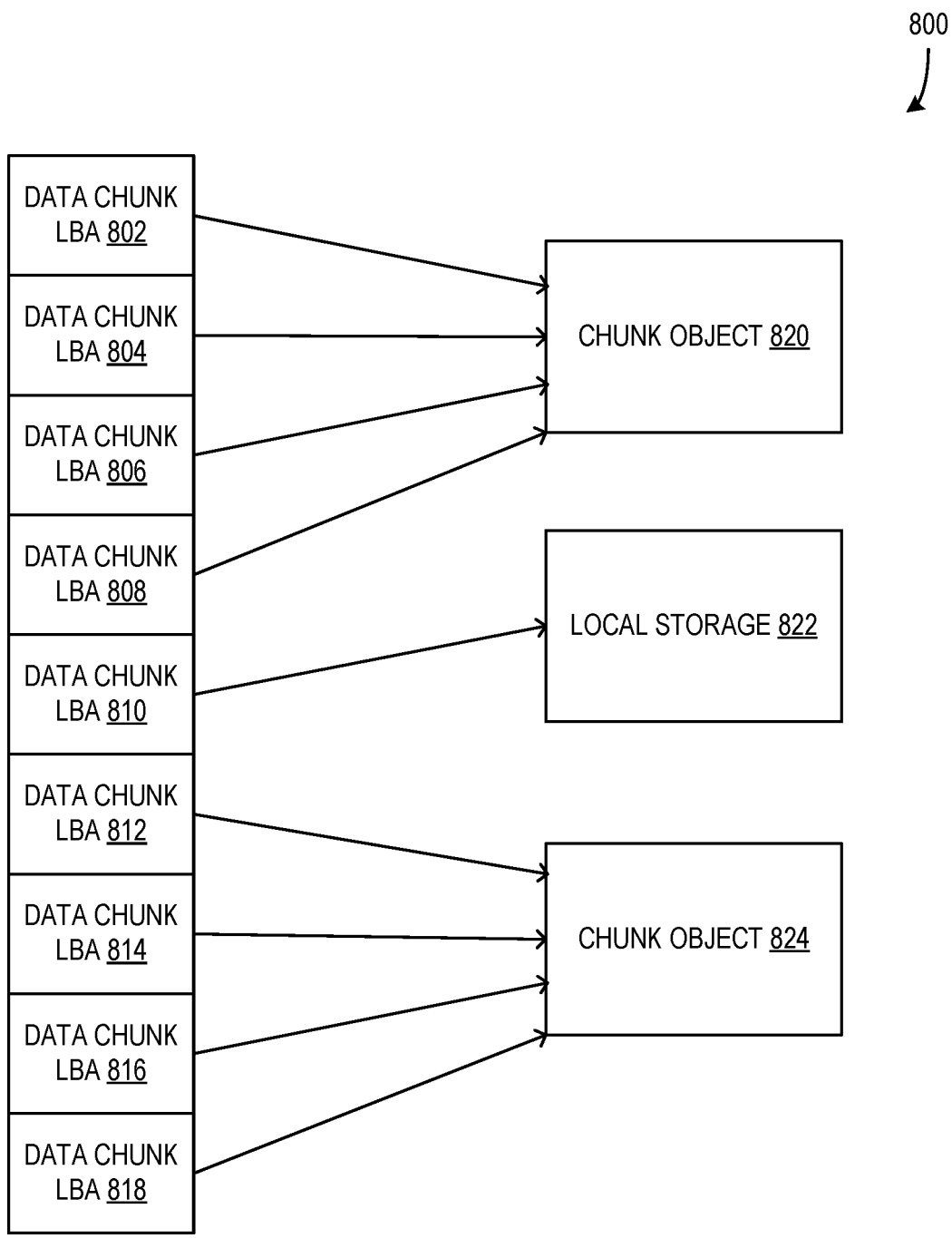
FIG. 8 is a block diagram illustrating an arrangement of data chunks associated with an original object.

FIG. 8 is a block diagram illustrating an arrangement 800 of data chunks associated with an original object. In some examples, the arrangement 800 is used in a system such as systems 1 and/or 2 of FIGS. 1 and/or 2, respectively. Further, in some examples, the arranged data chunks are accessed using a method such as method 700 of FIG. 7 as described above.

The data chunk LBAs 802-818 are stored in an address map of an original object (e.g., logical map 208 of original object 202). In some examples, the LBAs 802-818 are consecutive data chunk LBAs, such that the data chunks are logically organized in a series with, for instance, the data chunk of data chunk LBA 802 being logically "adjacent" to the data chunk of data chunk LBA 804. However, over the course of operation of the associated system, the data chunks associated with data chunk LBAs 802, 804, 806, and 808 have been deduplicated, resulting in those LBAs indirectly referencing a chunk object 820 where the associated payload data is stored. For example, data chunk LBA 802 in an address map of the original object is mapped to an object ID of the chunk object 820 and a chunk LBA associated with the location of the payload data within that chunk object 820.

Further, the data chunk of the data chunk LBA 810 is a unique data chunk and, as a result, the data chunk LBA 810 references the location of the payload data of the data chunk in local storage 822 (e.g., the unique data 212 data store in the original object 202).

Similar to the data chunks of data chunk LBAs 802-808, the data chunks of data chunk LBAs 812, 814, 816, and 818 have been deduplicated such that the data chunk LBAs indirectly reference another chunk object 824.

In some examples, for a read I/O request whose block range overlaps only the data chunks of data chunk LBAs 802-808, the original object only needs to send a single request to the chunk object 820 to obtain the payload data thereon. Because the spatial locality of the chunks is maintained on the chunk object 820, the performance of the read I/O process is similar to non-duplicated data stored on the original object locally. This is a significant improvement over other system designs in which deduplicated data chunks are distributed among multiple host devices according to their hash keys such that the locality of the data chunks is fragmented, resulting in read I/O operations that require multiple requests to multiple data objects.

Figure 9:
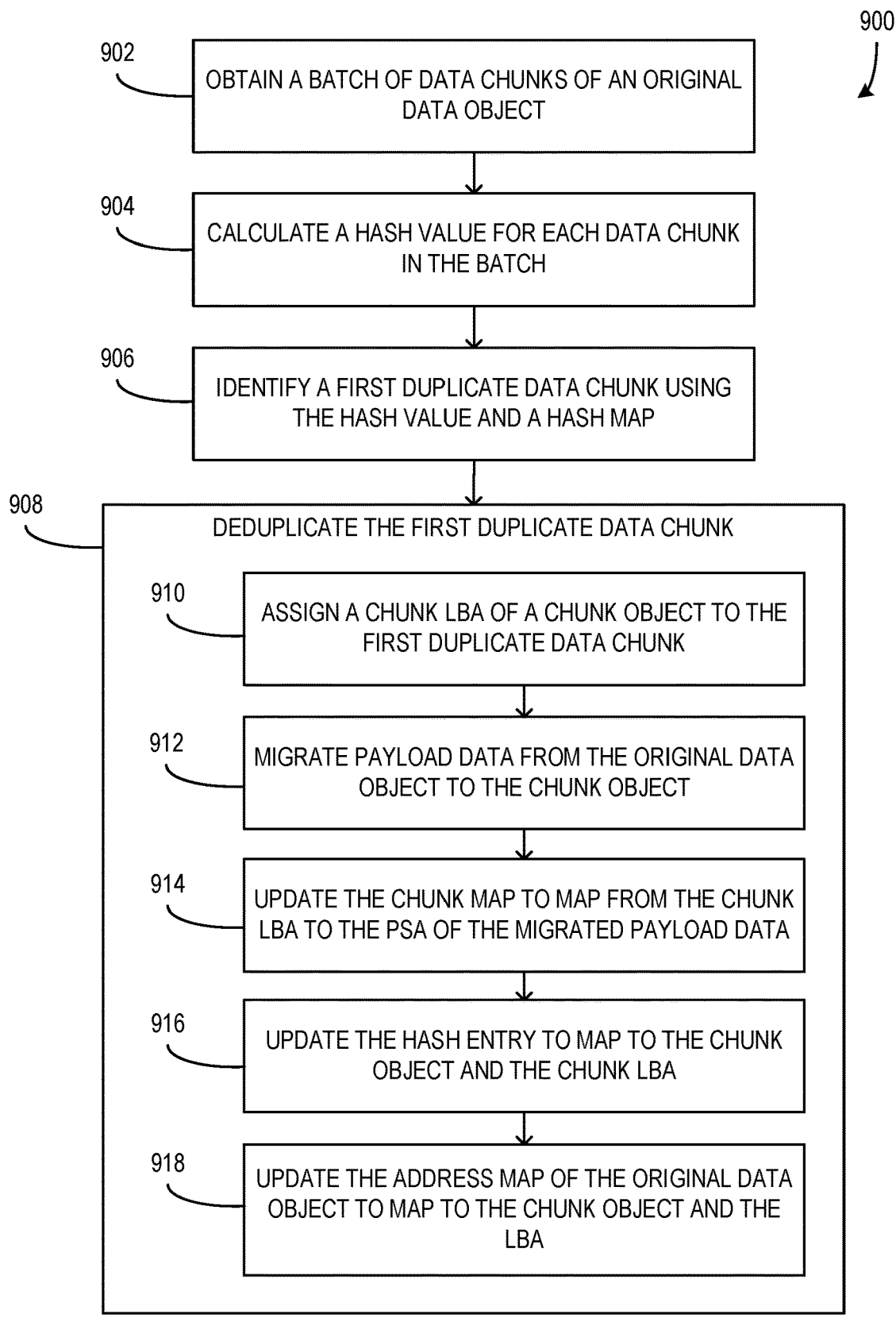
FIG. 9 is a flowchart illustrating an example method for deduplicating data chunks.

FIG. 9 is a flowchart illustrating an example method 900 for deduplicating data chunks (e.g., data chunks 213). In some examples, the method 900 is executed or otherwise performed in a system such as systems 1 and/or 2 of FIGS. 1 and/or 2, respectively.

At 902, a batch of data chunks (e.g., data chunks 213 and/or 269 referenced by LBAs 214-216) of an original data object (e.g., original object 202) is obtained.

At 904, a hash value (e.g., hash value 246) is calculated for each data chunk in the batch.

At 906, a first duplicate data chunk (e.g., a data chunk 213) is identified from the batch of data chunks using the hash value and a hash map (e.g., a hash map 244).

At 908, the identified first duplicate data chunk is deduplicated, wherein the deduplication operation includes the following operations 910-918.

At 910, a chunk LBA (e.g., a chunk LBA 270) of a chunk object (e.g., a chunk object 206) is assigned to the first duplicate data chunk.

At 912, payload data (e.g., payload data of the unique data 212 data store) of the first duplicate data chunk is migrated from the original data object to the chunk object (e.g., to the deduplicated data 268 data store of the chunk object 206).

At 914, the chunk map (e.g., the chunk map 266) of the chunk object is updated to map from the chunk LBA of the first duplicate data object to the PSA (e.g., the PSA 274) of the migrated payload data.

At 916, the hash entry associated with the first duplicate data chunk is updated to map to the chunk object and the chunk LBA of the first duplicate data chunk.

At 918, the entry of the address map (e.g., the middle map 210) of the original data object that is associated with the first duplicate data chunk is updated to map to the chunk object and the chunk LBA of the first duplicate data chunk.

Further, in an example, a second duplicate data chunk is identified in the batch of data chunks using the hash value of that second duplicate data chunk and the hash map. The second duplicate data chunk is found to be a duplicate of the first duplicate data chunk. The second duplicate data chunk is deduplicated using the following processes. The references value of the hash entry in the hash map that is indexed by the hash value of the second duplicate data chunk is incremented, representing that the LBA of the second duplicate data chunk will reference the data chunk with which the hash entry is associated. A chunk ID of the chunk object and the chunk LBA of the first duplicate data chunk are obtained using the hash map, and the address map of the original data object is updated to map the LBA of the second duplicate data chunk to the chunk object of the obtained chunk ID and the chunk LBA of the first duplicate data chunk. Thus, the LBAs of the first and second duplicate data chunks in the original data object are both referencing the same payload data associated with the chunk LBA in the chunk object.

Additionally, or alternatively, in some examples, deduplicating the first duplicate data chunk includes generating a unique hash value of the first duplicate data chunk and updating the hash entry of the hash map that is indexed by the hash value to include the generated unique hash value. Further, identifying the second duplicate data chunk in the batch of data chunks using the hash value of the second duplicate data chunk and the hash map includes the following processes. The hash entry in the hash map is found using the hash value of the second duplicate data chunk, which matches the hash value of the first duplicate data chunk. A unique hash value is generated for the second duplicate data chunk, and it is determined that the generated unique hash value of the second duplicate data chunk and the unique hash value in the hash entry match.

Still further, in some examples, a unique data chunk is identified in the batch of data chunks using the hash value of the unique data chunk and the hash map. For instance, the hash value of the unique data chunk is not found in the hash map, indicating that there is no duplicate chunk of the unique data chunk that has already been processed. The future deduplication of the identified unique data chunk is facilitated using the following processes. A hash entry is inserted into the hash map that is indexed by the hash value of the unique data chunk. The inserted hash entry is then updated to include an object ID of the original data object and to include an LBA that references the unique data chunk in the address map of the original data object, whereby the inserted hash entry enables the identification of future duplicate data chunks of the unique data chunk. In some such examples, the included LBA is an MBA 254 of a middle map 210 of the original data object, as described above at least with respect to FIG. 2.

In some examples, the first duplicate data chunk is part of a group of duplicate data chunks that have been identified in the batch of data chunks. The hash entries associated with the group of duplicate data chunks are stored in the hash maps of multiple hash objects because they are indexed or keyed based on the hash values of the duplicate data chunks. But the payload data of each duplicate data chunk of the group of duplicate data chunks is migrated to the single chunk object, maintaining the locality of those data chunks, as described herein.

Further, it should be understood that, in some examples, an initialized chunk object with available address space is not available in the system. In such examples, a chunk object is initialized with a continuous range of chunk LBAs prior to the deduplication of the next duplicate data chunk. This process can happen at the beginning of the processing of a batch of data chunks and/or in between processing of data chunks of a batch of data chunks.

Exemplary Operating Environment

Examples of the present disclosure are operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hard-coded machine. In some examples, platform software comprising an operating system 1020 or any other suitable platform software is provided on the apparatus 1018 to enable application software 1021 to be executed on the device. In some examples, deduplicating data chunks using chunk objects as described herein is accomplished by software, hardware, and/or firmware.

In some examples, computer executable instructions are provided using any computer-readable media that are accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 may also output data to devices other than the output device, e.g., a locally connected printing device. In some examples, a user provides input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, aspects of the disclosure are operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to: obtain a batch of data chunks of an original data object; calculate a hash value for each data chunk in the batch; identify a first duplicate data chunk in the batch of data chunks using the hash value of the first duplicate data chunk and a hash map; and deduplicate the identified first duplicate data chunk by: assigning a chunk logical block address (LBA) in a range of chunk LBAs of a chunk object to the first duplicate data chunk; migrating payload data of the first duplicate data chunk from the original data object to the chunk object; updating a chunk map of the chunk object to map the assigned chunk LBA of the first duplicate data chunk to a physical sector address (PSA) of the migrated payload data of the first duplicate data chunk on the chunk object; updating a hash entry indexed by the hash value of the first duplicate data chunk in the hash map to map to the chunk object and the assigned chunk LBA of the first duplicate data chunk; and updating an address map of the original data object to map an LBA of the first duplicate data chunk to the chunk object and the assigned chunk LBA of the first duplicate data chunk.

An example computerized method comprises: obtaining a batch of data chunks of an original data object; calculating a hash value for each data chunk in the batch; identifying a first duplicate data chunk in the batch of data chunks using the hash value of the first duplicate data chunk and a hash map; and deduplicating the identified first duplicate data chunk by: assigning a chunk logical block address (LBA) in a range of chunk LBAs of a chunk object to the first duplicate data chunk; migrating payload data of the first duplicate data chunk from the original data object to the chunk object; updating a chunk map of the chunk object to map the assigned chunk LBA of the first duplicate data chunk to a physical sector address (PSA) of the migrated payload data of the first duplicate data chunk on the chunk object; updating a hash entry indexed by the hash value of the first duplicate data chunk in the hash map to map to the chunk object and the assigned chunk LBA of the first duplicate data chunk; and updating an address map of the original data object to map an LBA of the first duplicate data chunk to the chunk object and the assigned chunk LBA of the first duplicate data chunk.

One or more computer storage media have computer-executable instructions that, upon execution by a processor, cause the processor to at least: obtain a batch of data chunks of an original data object; calculate a hash value for each data chunk in the batch; identify a first duplicate data chunk in the batch of data chunks using the hash value of the first duplicate data chunk and a hash map; and deduplicate the identified first duplicate data chunk by: assigning a chunk logical block address (LBA) in a range of chunk LBAs of a chunk object to the first duplicate data chunk; migrating payload data of the first duplicate data chunk from the original data object to the chunk object; updating a chunk map of the chunk object to map the assigned chunk LBA of the first duplicate data chunk to a physical sector address (PSA) of the migrated payload data of the first duplicate data chunk on the chunk object; updating a hash entry indexed by the hash value of the first duplicate data chunk in the hash map to map to the chunk object and the assigned chunk LBA of the first duplicate data chunk; and updating an address map of the original data object to map an LBA of the first duplicate data chunk to the chunk object and the assigned chunk LBA of the first duplicate data chunk.

Alternatively, or in addition to the other examples described herein, examples include any combination of the following:

further comprising: identifying a second duplicate data chunk in the batch of data chunks using the hash value of the second duplicate data chunk and the hash map, wherein the second duplicate data chunk is a duplicate of the first duplicate data chunk; and deduplicating the identified second duplicate data chunk by: incrementing a references value of a hash entry of the hash map that is indexed by the hash value of the second duplicate data chunk; obtaining a chunk ID of the chunk object and the chunk LBA of the first duplicate data chunk using the hash map; and updating the address map of the original data object to map an LBA of the second duplicate data chunk to the chunk object of the obtained chunk ID and the chunk LBA of the first duplicate data chunk.

wherein deduplicating the identified first duplicate data chunk further includes: generating a unique hash value of the first duplicate data chunk; and updating the hash entry of the hash map that is indexed by the hash value to include the generated unique hash value; wherein identifying the second duplicate data chunk in the batch of data chunks using the hash value of the second duplicate data chunk and the hash map includes: finding the hash entry in the hash map indexed by the hash value of the first duplicate data chunk, wherein the hash values of the first duplicate data chunk and the second duplicate data chunk match; generating a unique hash value of the second duplicate data chunk; and determining that the generated unique hash value of the second duplicate data chunk and the unique hash value in the hash entry indexed by the hash value of the first duplicate data chunk match.

further comprising: identifying a unique data chunk in the batch of data chunks using the hash value of the unique data chunk and the hash map; and facilitating future deduplication of the identified unique data chunk by: inserting a hash entry into the hash map that is indexed by the hash value of the unique data chunk; updating the inserted hash entry to include an object ID of the original data object; and updating the inserted hash entry to include an LBA that references the unique data chunk in the address map of the original data object, whereby the inserted hash entry enables the identification of future duplicate data chunks of the unique data chunk.

wherein the first duplicate data chunk is part of a group of duplicate data chunks identified in the batch of data chunks of the original data object; wherein hash entries associated with the group of duplicate data chunks are stored in hash maps of multiple hash objects; and wherein payload data of each duplicate data chunk of the group of duplicate data chunks is migrated to the chunk object.

further comprising: receiving a request to access a plurality of requested data chunks of the group of duplicate data chunks at the original data object, wherein the request includes an LBA for each data chunk of the plurality of requested data chunks; accessing entries in the address map of the original data object using the included LBAs of the plurality of requested data chunks; obtaining a chunk ID of the chunk object and chunk LBAs of the plurality of requested data chunks using the accessed entries in the address map of the original data object; accessing chunk entries in the chunk map of the chunk object using the obtained chunk ID and the obtained chunk LBAs of the plurality of requested data chunks; obtaining payload data of the plurality of requested data chunks using the accessed chunk entries; and providing the obtained payload data in response to the received request.

further comprising: determining that an initialized chunk object with remaining available address space is not available; and initializing the chunk object with a continuous range of chunk LBAs prior to first duplicate data chunk being deduplicated.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a batch of data chunks of an original data object; exemplary means for calculating a hash value for each data chunk in the batch; exemplary means for identifying a first duplicate data chunk in the batch of data chunks using the hash value of the first duplicate data chunk and a hash map; and exemplary means for deduplicating the identified first duplicate data chunk using: exemplary means for assigning a chunk logical block address (LBA) in a range of chunk LBAs of a chunk object to the first duplicate data chunk; exemplary means for migrating payload data of the first duplicate data chunk from the original data object to the chunk object; exemplary means for updating a chunk map of the chunk object to map the assigned chunk LBA of the first duplicate data chunk to a physical sector address (PSA) of the migrated payload data of the first duplicate data chunk on the chunk object; exemplary means for updating a hash entry indexed by the hash value of the first duplicate data chunk in the hash map to map to the chunk object and the assigned chunk LBA of the first duplicate data chunk; and exemplary means for updating an address map of the original data object to map an LBA of the first duplicate data chunk to the chunk object and the assigned chunk LBA of the first duplicate data chunk.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
 a chunk deduplicator obtaining a batch of data chunks of an original data object;
 a hash value generator of the chunk deduplicator calculating a hash value for each data chunk in the batch;
 a duplicate identifier of the chunk deduplicator identifying a first duplicate data chunk in the batch of data chunks using the hash value of the first duplicate data chunk and a hash map, wherein the hash map indexes data chunks with hash values of the indexed data chunks; and
 the chunk deduplicator deduplicating the identified first duplicate data chunk by:
   assigning a chunk logical block address (LBA) in a range of chunk LBAs of a chunk object to the first duplicate data chunk;
   migrating payload data of the first duplicate data chunk from the original data object to the chunk object;
   updating a chunk map of the chunk object to map the assigned chunk LBA of the first duplicate data chunk to a physical sector address (PSA) of the migrated payload data of the first duplicate data chunk on the chunk object;
   updating a hash entry indexed by the hash value of the first duplicate data chunk in the hash map to map to the chunk object and the assigned chunk LBA of the first duplicate data chunk; and updating an address map of the original data object to map an LBA of the first duplicate data chunk to the chunk object and the assigned chunk LBA of the first duplicate data chunk.

2. The system of claim 1, further comprising:

the duplicate identifier identifying a second duplicate data chunk in the batch of data chunks using the hash value of the second duplicate data chunk and the hash map, wherein the second duplicate data chunk is a duplicate of the first duplicate data chunk; and the chunk deduplicator deduplicating the identified second duplicate data chunk by:

incrementing a references value of a hash entry of the hash map that is indexed by the hash value of the second duplicate data chunk;

obtaining a chunk ID of the chunk object and the chunk LBA of the first duplicate data chunk using the hash map; and updating the address map of the original data object to map an LBA of the second duplicate data chunk to the chunk object of the obtained chunk ID and the chunk LBA of the first duplicate data chunk.

3. The system of claim 2, wherein deduplicating the identified first duplicate data chunk further includes:

generating a unique hash value of the first duplicate data chunk; and updating the hash entry of the hash map that is indexed by the hash value to include the generated unique hash value;

wherein identifying the second duplicate data chunk in the batch of data chunks using the hash value of the second duplicate data chunk and the hash map includes:

finding the hash entry in the hash map indexed by the hash value of the first duplicate data chunk, wherein the hash values of the first duplicate data chunk and the second duplicate data chunk match;

generating a unique hash value of the second duplicate data chunk; and determining that the generated unique hash value of the second duplicate data chunk and the unique hash value in the hash entry indexed by the hash value of the first duplicate data chunk match.

4. The system of claim 1, further comprising:

the duplicate identifier identifying a unique data chunk in the batch of data chunks using the hash value of the unique data chunk and the hash map; and the chunk deduplicator facilitating future deduplication of the identified unique data chunk by:

inserting a hash entry into the hash map that is indexed by the hash value of the unique data chunk;

updating the inserted hash entry to include an object ID of the original data object; and updating the inserted hash entry to include an LBA that references the unique data chunk in the address map of the original data object, whereby the inserted hash entry enables identification of future duplicate data chunks of the unique data chunk.

5. The system of claim 1, wherein the first duplicate data chunk is part of a group of duplicate data chunks identified in the batch of data chunks of the original data object;

wherein hash entries associated with the group of duplicate data chunks are stored in hash maps of multiple hash objects; and wherein payload data of each duplicate data chunk of the group of duplicate data chunks is migrated to the chunk object.

6. The system of claim 5, further comprising:

a request processing module receiving a request to access a plurality of requested data chunks of the group of duplicate data chunks at the original data object, wherein the request includes an LBA for each data chunk of the plurality of requested data chunks;

the request processing module accessing entries in the address map of the original data object using the included LBAs of the plurality of requested data chunks;

the request processing module obtaining a chunk ID of the chunk object and chunk LBAs of the plurality of requested data chunks using the accessed entries in the address map of the original data object;

the request processing module accessing chunk entries in the chunk map of the chunk object using the obtained chunk ID and the obtained chunk LBAs of the plurality of requested data chunks;

the request processing module obtaining payload data of the plurality of requested data chunks using the accessed chunk entries; and the request processing module providing the obtained payload data in response to the received request.

7. The system of claim 1, further comprising:

the chunk deduplicator determining that an initialized chunk object with remaining available address space is not available; and the chunk deduplicator initializing the chunk object with a continuous range of chunk LBAs prior to the first duplicate data chunk being deduplicated.

8. A computerized method comprising:

obtaining a batch of data chunks of an original data object;

calculating a hash value for each data chunk in the batch;

identifying a first duplicate data chunk in the batch of data chunks using the hash value of the first duplicate data chunk and a hash map, wherein the hash map indexes data chunks with hash values of the indexed data chunks; and deduplicating the identified first duplicate data chunk by:

assigning a chunk logical block address (LBA) in a range of chunk LBAs of a chunk object to the first duplicate data chunk;

migrating payload data of the first duplicate data chunk from the original data object to the chunk object;

updating a chunk map of the chunk object to map the assigned chunk LBA of the first duplicate data chunk to a physical sector address (PSA) of the migrated payload data of the first duplicate data chunk on the chunk object;

updating a hash entry indexed by the hash value of the first duplicate data chunk in the hash map to map to the chunk object and the assigned chunk LBA of the first duplicate data chunk; and updating an address map of the original data object to map an LBA of the first duplicate data chunk to the chunk object and the assigned chunk LBA of the first duplicate data chunk.

9. The computerized method of claim 8, further comprising:

identifying a second duplicate data chunk in the batch of data chunks using the hash value of the second duplicate data chunk and the hash map, wherein the second duplicate data chunk is a duplicate of the first duplicate data chunk; and deduplicating the identified second duplicate data chunk by:
  incrementing a references value of a hash entry of the hash map that is indexed by the hash value of the second duplicate data chunk;
  obtaining a chunk ID of the chunk object and the chunk LBA of the first duplicate data chunk using the hash map; and
  updating the address map of the original data object to map an LBA of the second duplicate data chunk to the chunk object of the obtained chunk ID and the chunk LBA of the first duplicate data chunk.

10. The computerized method of claim 9, wherein deduplicating the identified first duplicate data chunk further includes:
  generating a unique hash value of the first duplicate data chunk; and
  updating the hash entry of the hash map that is indexed by the hash value to include the generated unique hash value;
  wherein identifying the second duplicate data chunk in the batch of data chunks using the hash value of the second duplicate data chunk and the hash map includes:
    finding the hash entry in the hash map indexed by the hash value of the first duplicate data chunk, wherein the hash values of the first duplicate data chunk and the second duplicate data chunk match;
    generating a unique hash value of the second duplicate data chunk; and
    determining that the generated unique hash value of the second duplicate data chunk and the unique hash value in the hash entry indexed by the hash value of the first duplicate data chunk match.

11. The computerized method of claim 8, further comprising:
  identifying a unique data chunk in the batch of data chunks using the hash value of the unique data chunk and the hash map; and
  facilitating future deduplication of the identified unique data chunk by:
    inserting a hash entry into the hash map that is indexed by the hash value of the unique data chunk;
    updating the inserted hash entry to include an object ID of the original data object; and
    updating the inserted hash entry to include an LBA that references the unique data chunk in the address map of the original data object, whereby the inserted hash entry enables the identification of future duplicate data chunks of the unique data chunk.

12. The computerized method of claim 8, wherein the first duplicate data chunk is part of a group of duplicate data chunks identified in the batch of data chunks of the original data object;
  wherein hash entries associated with the group of duplicate data chunks are stored in hash maps of multiple hash objects; and
  wherein payload data of each duplicate data chunk of the group of duplicate data chunks is migrated to the chunk object.

13. The computerized method of claim 12, further comprising:
  receiving a request to access a plurality of requested data chunks of the group of duplicate data chunks at the original data object, wherein the request includes an LBA for each data chunk of the plurality of requested data chunks;
  accessing entries in the address map of the original data object using the included LBAs of the plurality of requested data chunks;
  obtaining a chunk ID of the chunk object and chunk LBAs of the plurality of requested data chunks using the accessed entries in the address map of the original data object;
  accessing chunk entries in the chunk map of the chunk object using the obtained chunk ID and the obtained chunk LBAs of the plurality of requested data chunks;
  obtaining payload data of the plurality of requested data chunks using the accessed chunk entries; and
  providing the obtained payload data in response to the received request.

14. The computerized method of claim 8, further comprising:
  determining that an initialized chunk object with remaining available address space is not available; and
  initializing the chunk object with a continuous range of chunk LBAs prior to the first duplicate data chunk being deduplicated.

15. One or more computer storage media having computer-executable instructions that, upon execution by a processor, cause the processor to at least:
  obtain a batch of data chunks of an original data object;
  calculate a hash value for each data chunk in the batch;
  identify a first duplicate data chunk in the batch of data chunks using the hash value of the first duplicate data chunk and a hash map, wherein the hash map indexes data chunks with hash values of the indexed data chunks; and
  deduplicate the identified first duplicate data chunk by:
    assigning a chunk logical block address (LBA) in a range of chunk LBAs of a chunk object to the first duplicate data chunk;
    migrating payload data of the first duplicate data chunk from the original data object to the chunk object;
    updating a chunk map of the chunk object to map the assigned chunk LBA of the first duplicate data chunk to a physical sector address (PSA) of the migrated payload data of the first duplicate data chunk on the chunk object;
    updating a hash entry indexed by the hash value of the first duplicate data chunk in the hash map to map to the chunk object and the assigned chunk LBA of the first duplicate data chunk; and
    updating an address map of the original data object to map an LBA of the first duplicate data chunk to the chunk object and the assigned chunk LBA of the first duplicate data chunk.

16. The computer storage media of claim 15, wherein the computer-executable instructions, upon execution by a processor, further cause the processor to at least:
  identify a second duplicate data chunk in the batch of data chunks using the hash value of the second duplicate data chunk and the hash map, wherein the second duplicate data chunk is a duplicate of the first duplicate data chunk; and
  deduplicate the identified second duplicate data chunk by:
    incrementing a references value of a hash entry of the hash map that is indexed by the hash value of the second duplicate data chunk;
    obtaining a chunk ID of the chunk object and the chunk LBA of the first duplicate data chunk using the hash map; and
    updating the address map of the original data object to map an LBA of the second duplicate data chunk to the chunk object of the obtained chunk ID and the chunk LBA of the first duplicate data chunk.

17. The computer storage media of claim 16, wherein deduplicating the identified first duplicate data chunk further includes:
generating a unique hash value of the first duplicate data chunk; and
updating the hash entry of the hash map that is indexed by the hash value to include the generated unique hash value;
wherein identifying the second duplicate data chunk in the batch of data chunks using the hash value of the second duplicate data chunk and the hash map includes:
finding the hash entry in the hash map indexed by the hash value of the first duplicate data chunk, wherein the hash values of the first duplicate data chunk and the second duplicate data chunk match;
generating a unique hash value of the second duplicate data chunk; and
determining that the generated unique hash value of the second duplicate data chunk and the unique hash value in the hash entry indexed by the hash value of the first duplicate data chunk match.

18. The computer storage media of claim 15, wherein the computer-executable instructions, upon execution by a processor, further cause the processor to at least:
identify a unique data chunk in the batch of data chunks using the hash value of the unique data chunk and the hash map; and
facilitate future deduplication of the identified unique data chunk by:
inserting a hash entry into the hash map that is indexed by the hash value of the unique data chunk;
updating the inserted hash entry to include an object ID of the original data object; and
updating the inserted hash entry to include an LBA that references the unique data chunk in the address map of the original data object, whereby the inserted hash entry enables identification of future duplicate data chunks of the unique data chunk.

19. The computer storage media of claim 15, wherein the first duplicate data chunk is part of a group of duplicate data chunks identified in the batch of data chunks of the original data object;
wherein hash entries associated with the group of duplicate data chunks are stored in hash maps of multiple hash objects; and
wherein payload data of each duplicate data chunk of the group of duplicate data chunks is migrated to the chunk object.

20. The computer storage media of claim 19, wherein the computer-executable instructions, upon execution by a processor, further cause the processor to at least:
receive a request to access a plurality of requested data chunks of the group of duplicate data chunks at the original data object, wherein the request includes an LBA for each data chunk of the plurality of requested data chunks;
access entries in the address map of the original data object using the included LBAs of the plurality of requested data chunks;
obtain a chunk ID of the chunk object and chunk LBAs of the plurality of requested data chunks using the accessed entries in the address map of the original data object;
access chunk entries in the chunk map of the chunk object using the obtained chunk ID and the obtained chunk LBAs of the plurality of requested data chunks;
obtain payload data of the plurality of requested data chunks using the accessed chunk entries; and
provide the obtained payload data in response to the received request.

* * * * *